United States Patent Office 2,774,213
Patented Dec. 18, 1956

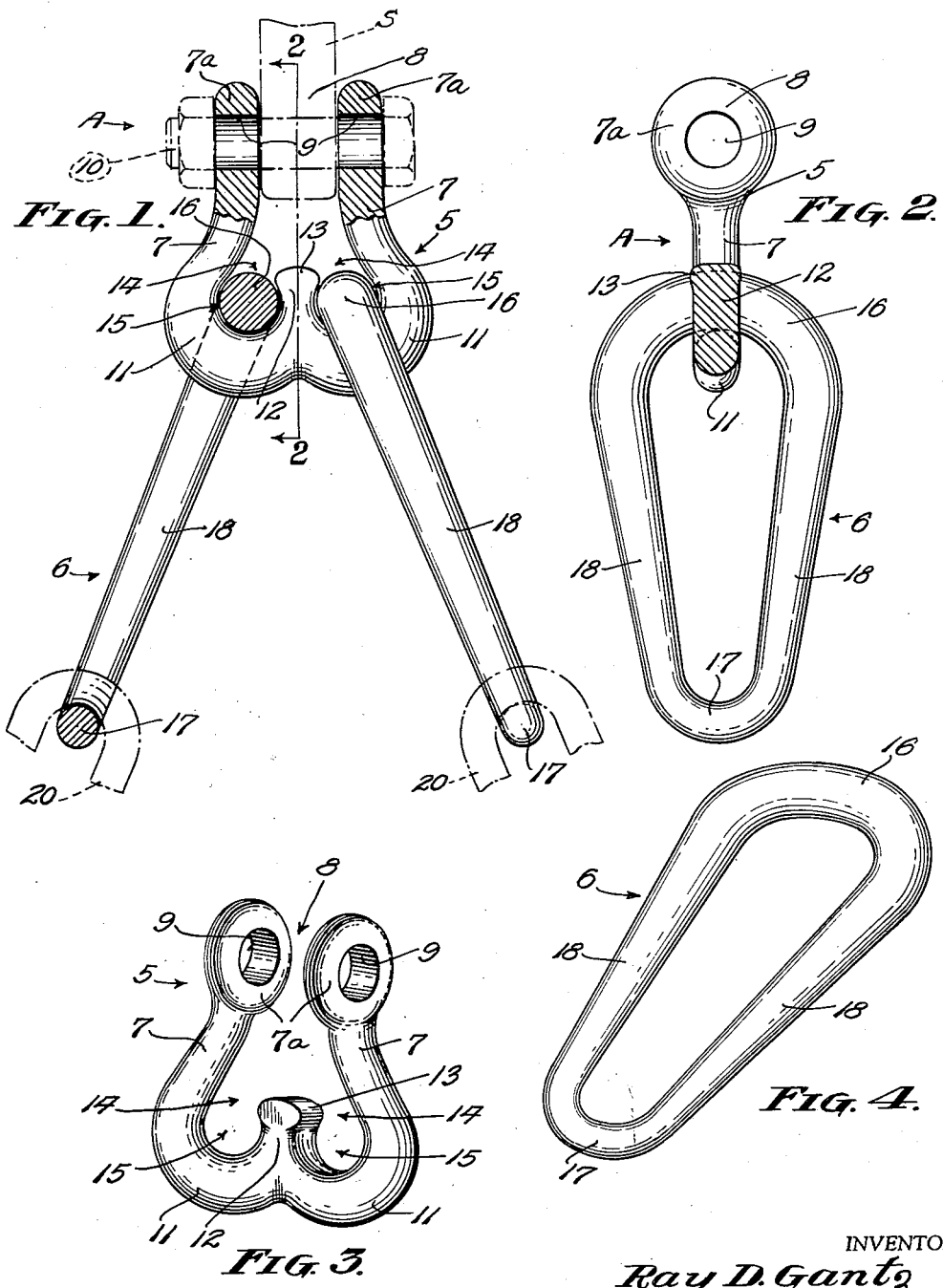

2,774,213

CLEVIS WITH TWO POSITIONED SPACED LINK

Ray D. Gantz, Columbus, Ohio, assignor to The Carroll Chain Company, Columbus, Ohio, a corporation of Ohio Application September 28, 1955, Serial No. 537,093

3 Claims. (Cl. 59—84)

This invention relates generally to chain fasteners having particular reference to an improved shackle and link assembly for use in anchoring lengths of link chain to associated bodies or objects.

It is an object of the present invention to provide a chain fastener consisting of a shackle and an end link and wherein the shackle is formed to interlock with the link, when the latter is operatively positioned, to prevent separation thereof, the construction being such as to require the shackle and end link to be relatively positioned in a non-operative order before the same may be separated.

Another object of the invention is to provide a chain fastener of this type which includes an end link, possessing greater cross-sectional diameter at one end than at its other, whereby to enable the end of the link possessing the smaller diameter to be initially inserted in and passed through a restricted opening leading to a seating pocket of an associated shackle, the link being thereafter turned to bring the end thereof having the greater diameter into operative seating engagement with the pocket of the shackle, the larger diameter of the link being such as to prevent link passage through said restricted opening.

A further object is to provide a chain fastener of this character wherein the shackle thereof is formed symmetrically on opposite sides of the center thereof to receive in interlocking but removable engagement a pair of end links.

For a further understanding of the invention, reference is to be had to the following description and the accompanying drawing, wherein:

Fig. 1 is a view partly in front elevation and partly in vertical section of a chain fastener formed in accordance with the present invention;

Fig. 2 is a detail vertical transverse sectional view taken on the line 2—2 of Fig. 1;

Fig. 3 is a detail perspective view of the shackle element of my improved chain fastener;

Fig. 4 is a similar view of the associated end link.

Referring to the drawings by the use of reference characters, the numeral 5 designates in its entirety the shackle of my improved chain fastener A and the numeral 6 the end links associated therewith. As here shown, the shackle is of a double pocket type. This is done in order that a pair of end links may be carried thereby.

The particular shackle illustrated comprises a substantially U-shaped body formed to include a pair of transversely spaced side arms 7. These arms have the relatively separated, free ends thereof formed with eyes 7a disposed to provide the shackle with an entrance passage 8. The eyes 7a are formed with aligned openings 9 adapted for the reception of a bolt or pin 10. The latter is used in uniting the shackle, following insertion of the end link or links therein, with an associated supporting structure S upon which the fastener A is adapted to be removably mounted.

The side arms 7 merge into arcuate link-receiving and seating pockets 11, the latter being disposed symmetrically on opposite sides of a plane passing centrally and longitudinally through the shackle. In this central plane, the shackle is formed with an inwardly projecting web or lug 12, the latter having its opposite sides curved to conform with and constitute a prolongation of the curved inner surfaces of the pockets 11. The outer end of the lug terminates in an enlarged knob 13, the sides of which are spaced from the adjacent inner surfaces of the shackle arms 7 to provide restricted openings 14 for the passage of the end links into and out of engagement with the seating surfaces of the pockets 15 of the shackle.

The end links are each of a solid, continuous type, the same possessing a substantially pear-shaped configuration. One of the semicircular ends 16 thereof is formed to possess a width substantially greater than that of the smaller diameter end 17, the sides 18 of each link converging from the larger end toward the smaller. In this design, the cross sectional diameter of each link, as taken through the end region 16, is greater, see Fig. 1, than the cross-sectional diameter of the end region 17.

With the parts of the fastener A so formed, it will be clear that in order to insert the end links into the shackle to form the complete fastener assembly, and with the shackle separated from the structure S to which it is adapted to be secured, each link is held preferably so that the smaller end 17 may be passed through the shackle entrance 8 and with sustained motion through the opening 14 into seating contact with one of the pockets 15 of the shackle. Upon being so positioned in one of said pockets, the link is turned or rotated so that the larger end 16 thereof occupies the pocket, as in Fig. 1. When so operatively seated, it will be noted that the cross-sectional diameter of the end 16 exceeds the width dimension of the entrance opening 14 of the pocket. This condition provides for normal link movement and articulation in the shackle but prevents the links from slipping out of their respective seats as provided by the pockets 15, thus preventing relative abrading and entanglement of the links and undue wear and part displacement. The pocketed regions 11 of the shackle are of relatively larger diameter than the side arms 7 thereof, in order to provide the mechanical strength and wear resistance in producing a fastener of long operating life. A length of chain 20 is adapted to be connected with each end link 6 at the smaller end thereof.

It will be understood that the construction herein specifically defined is subject to certain variation or modification within the spirit and scope of the appended claims.

I claim:

1. A chain-fastening assembly comprising: a U-shaped shackle symmetrical about a central longitudinally extending plane; said shackle including a pair of side arms formed at their outer ends with transversely spaced, registering eyes defining a link-inserting passage and at their opposite ends with a cross web having integral, arcuate loops and a centrally disposed, inwardly and longitudinally extending lug defining with said loops a pair of separated link-receiving and seating pockets; the outer end of said lug being enlarged and spaced from adjacent inner surfaces of said arms to provide restricted entrances to said pockets; and a pair of closed, end links of pear-shape configuration positioned in said shackle; each of said links being larger at one end thereof, both in cross-sectional thickness and total breadth, than at the other end thereof, whereby to permit the smaller end of each link to be passed through the restricted entrances of said pockets to initially position the links in said pockets and then be turned to bring the ends thereof having the greater breadth and cross-sectional thickness into seated positions within said pockets, the cross-sectional diameter of the larger end of each of said links exceeding the width of the entrance to each of said pockets, 2. A chain-fastening assembly comprising: a shackle generally U-shaped in configuration and symmetrical about its longitudinal center; said shackle including a pair of side arms terminating outwardly in spaced relation to define a link passage, said arms terminating at the opposite end of the shackle in substantially semicircular loops defining a link-receiving pocket on each side of the center thereof, each of said pockets including a link entrance spaced inwardly of the shackle from the passage therein of restricted width; and a closed link formed to be seated in each of said pockets, each of said links at one end thereof possessing a greater cross-sectional thickness than the opposite end thereof, each link, after being positioned in said shackle by insertion through said passage, having its end of smaller diameter presented to the entrance of one of said pockets and moved through said entrance for disposal in an associated pocket, the diameter of each of said pockets enabling a link inserted therein to be manipulated in bringing the larger end of the link into a seated operative position within the pocket, the larger end of said link having a cross-sectional dimension greater than the width of the entrance of each of said pockets to preclude casual movement of a link from the pocket in which it is positioned until the link is again manipulated to present the smaller end thereof in registry with said entrance.

3. As a new article of manufacture, a shackle for fastening chain, comprising: a generally U-shaped body symmetrical about a plane passing longitudinally and centrally therethrough; said shackle body being formed at one end thereof with a pair of relatively spaced side arms which terminate in transversely spaced apertured eyes defining a sole entrance for the positioning of end links in said shackle; said arms at the opposite end of the shackle merging into an integral arcuate loop; a lug having an enlarged outer end integrally formed with said loop; said lug projecting into said shackle and occupying a central longitudinal position therein; said lug forming in connection with the inner surfaces of said loop on opposite sides of the lug a pair of link-seating pockets, the latter having link entrances establishing communication between the interiors of said shackle and said pockets, the width of each of said entrances being less than the diameter of each pocket.

References Cited in the file of this patent

UNITED STATES PATENTS

| | | |
|---|---|---|
| 569,863 | Du Bois | Oct. 20, 1896 |
| 756,481 | Du Puis | Apr. 5, 1904 |
| 1,769,876 | Duncan | July 1, 1930 |
| 1,894,914 | Stahl | Jan. 17, 1933 |
| 2,490,218 | Kirby | Dec. 6, 1949 |

FOREIGN PATENTS

| | | |
|---|---|---|
| 36,448 | Sweden | July 16, 1913 |